United States Patent [19]
Jung

[11] Patent Number: 5,836,438
[45] Date of Patent: Nov. 17, 1998

[54] DEVICE FOR AUTOMATICALLY TURNING OVER WORK PIECES

[75] Inventor: Jong-Kun Jung, Seoul, Rep. of Korea

[73] Assignee: Daewoo Electronics, Co., Ltd., Rep. of Korea

[21] Appl. No.: 649,155

[22] Filed: May 17, 1996

[30] Foreign Application Priority Data

May 18, 1995 [KR] Rep. of Korea .................. 1995-12343

[51] Int. Cl.⁶ .................................................. B65G 47/24
[52] U.S. Cl. .......................................... 198/402; 414/764
[58] Field of Search .................................. 414/754, 758, 414/764, 765, 771, 773; 198/379, 402

[56] References Cited

U.S. PATENT DOCUMENTS

| | | | |
|---|---|---|---|
| 2,661,101 | 12/1953 | Mullan et al. | 414/758 |
| 2,865,516 | 12/1958 | Hedderich | 414/765 |
| 3,948,385 | 4/1976 | Shinomiya | 414/773 |
| 4,523,670 | 6/1985 | Yanagisawa | 414/758 |
| 4,699,564 | 10/1987 | Cetrangolo | 414/765 |
| 4,798,278 | 1/1989 | Cornacchia | 414/765 |
| 5,358,372 | 10/1994 | Meredith | 414/773 |

FOREIGN PATENT DOCUMENTS 1296252  3/1987  U.S.S.R. ................................. 414/765

*Primary Examiner*—Karen M. Young
*Assistant Examiner*—Gregory A. Morse
*Attorney, Agent, or Firm*—Pennie & Edmonds LLP

[57] ABSTRACT

A device for turning over work pieces includes a base, a pair of conveyor belts for transferring the work pieces in one direction, with the work pieces being kept on upper surfaces thereof. The pair of conveyor belts are mounted on the base in a parallel relationship with each other, putting a separation therebetween. The turning-over device further includes a receiving holder provided with a substantially U-shaped receiver and a connection joined thereto, having a rotation axis horizontally extending at a right angle with the transfer direction of the conveyor belts. The receiving holder is located between the pair of conveyor belts and is rotatable between a first position, wherein the work piece is inserted into the U-shaped receiver and a second position, wherein the work piece is discharged from the U-shaped receiver. The turning-over device further includes a holder controller for rotating the receiving holder to the second position, when the work piece is inserted into the U-shaped receiver and for reversely rotating the receiving holder to the first position, when the work piece leaves the U-shaped receiver.

6 Claims, 4 Drawing Sheets

DEVICE FOR AUTOMATICALLY TURNING OVER WORK PIECES

FIELD OF THE INVENTION

The present invention relates to an automated manufacturing line; and, more particularly, to a device for use therein capable of efficiently turning over work pieces which are continuously fed in one direction.

DESCRIPTION OF THE PRIOR ART

There is often employed in an automated manufacturing line a device for turning over work pieces to allow changing of the sites to be worked on. One example of such a device is the device for turning over a head drum employed in an automated video cassette recorder manufacturing line.

Normally, these devices are provided with a clamping means for grasping the work piece, a cylinder means for flipping the work piece and a separate transfer means for moving the work piece to the cylinder means.

In spite of the fact that these devices are capable of adequately performing their assigned tasks, however, there has been a continuous effort in improving the efficiency in these devices.

SUMMARY OF THE INVENTION

It is, therefore, a primary object of the invention to provide a device for turning over work pieces having an improved efficiency.

In accordance with the present invention, there is provided a device for turning over work pieces comprising: a base; a pair of transfer means for transferring the work pieces in one direction, with the work pieces being kept on upper surfaces thereof, the pair of transfer means mounted on the base in a parallel relationship with each other and separated by a gap therebetween; a receiving holder including a connection provided with a rotation axis horizontally extending at a right angle with respect to the transfer direction of the transfer means and a substantially U-shaped receiver formed with the connection to have its opening positioned radially farthest, the receiving holder rotatably mounted between the pair of transfer means between a first position, wherein the work piece fed from by the pair of transfer means is inserted into the U-shaped receiver and a second position, wherein the work piece is discharged from the U-shaped receiver by the pair of transfer means; and a holder control means for rotating the receiving holder to the second position, when the work piece is inserted into the U-shaped receiver and for reversely rotating the receiving holder to the first position, when the work piece is discharged from the U-shaped receiver.

BRIEF DESCRIPTION OF THE DRAWINGS

The above and other objects and features of the present invention will become apparent from the following description of preferred embodiments, when given in conjunction with the accompanying drawings, in which.

DETAILED DESCRIPTION OF THE PREFERRED EMBODIMENTS

Figure 1:
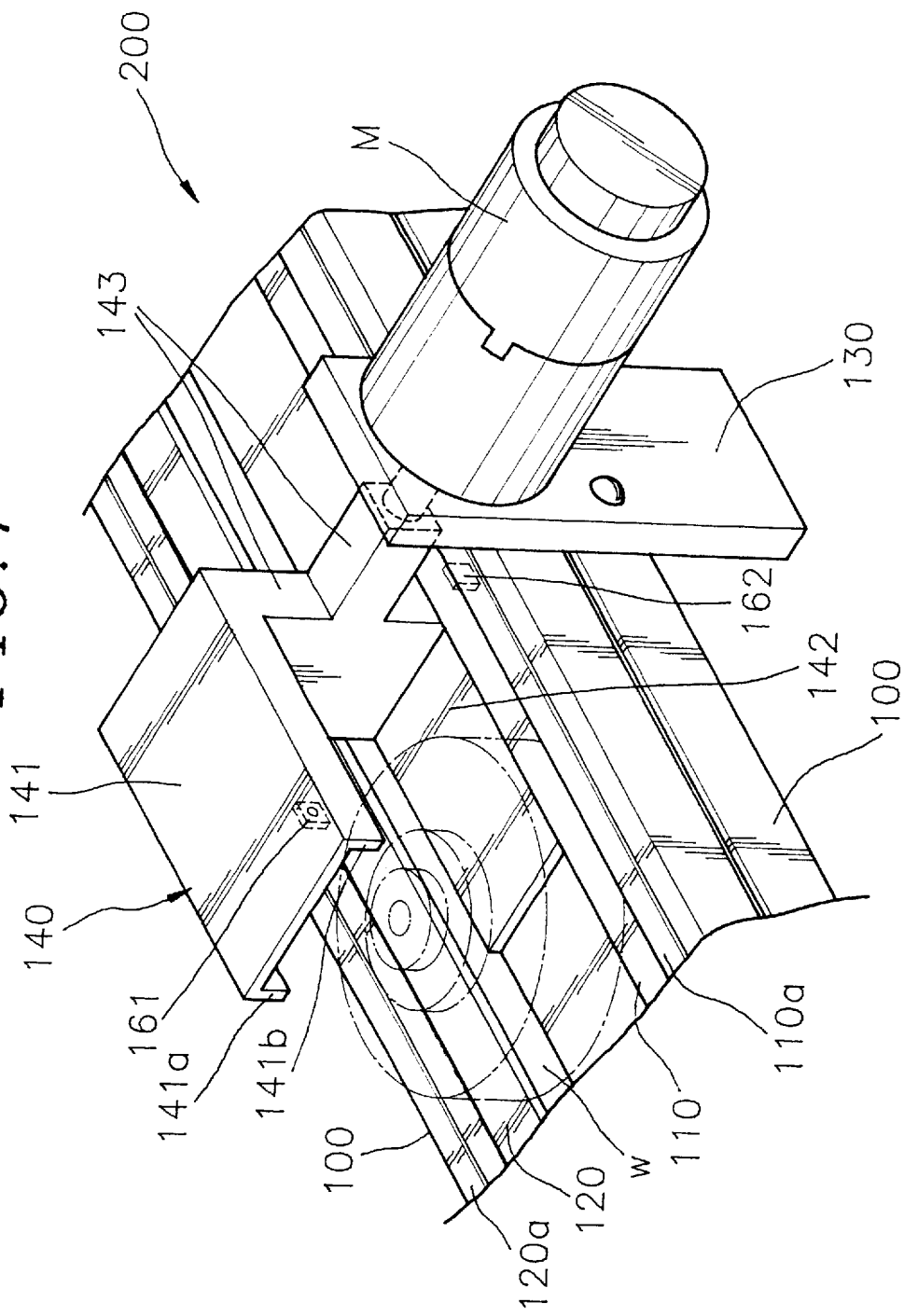
FIG. 1 shows a perspective view of a device for turning over work pieces in accordance with the present invention.

FIG. 1 shows a perspective view of a device 200 for turning over work pieces in accordance with the present invention. As shown, the inventive device 200 is provided with a base 100 and a pair of conveyor belts 110 and 120 on which a plurality of work pieces are placed. The pair of conveyor belts 110 and 120, spaced apart, are in a parallel relationship with each other. The work pieces are carried by the pair of conveyor belts 110 and 120 in such a manner that both lateral ends of each of the work pieces are retained on upper surfaces of the conveyor belts 110 and 120, respectively.

The turning-over device 200 also includes a support plate 130 mounted on a lateral portion of the base 100 and a motor M fixed to the support plate 130.

Figure 2:
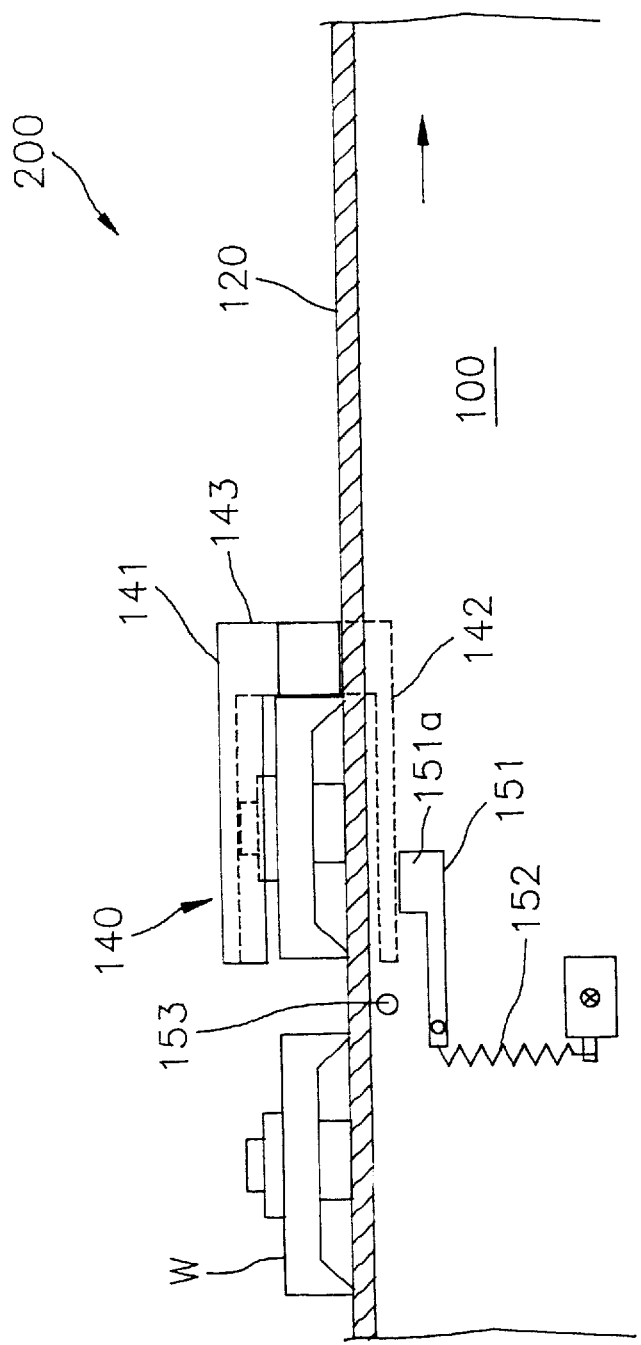
FIGS. 2 and 3 illustrate side sectional views of the inventive device for turning over work pieces, wherein a receiving holder is in a first position and a second position, respectively.

Referring FIGS. 1 and 2, mounted between the pair of conveyor belts 110 and 120 is a receiving holder 140 of a substantially U-shaped configuration. The receiving holder 140 is provided with an upper plate 141 having a pair of guides 141a and 141b downwardly extending therefrom, and a lower plate 142 facing toward the upper plate 141, being spaced therefrom. The upper plate 141 and the lower plate 142 are integrally jointed by a connection 143 therebetween.

The receiving holder 140 constructed in this manner is rotatable between a first position, wherein an opening of the U-shaped configuration faces toward the incoming direction of work pieces, and a second position, wherein the opening of the U-shaped configuration faces toward the discharging direction of work pieces. In the first position, the lower plate 142 is located under the work pieces W; and in the second position, the upper plate 141 is located under the work pieces W.

The rotation axis Ms of the motor M is connected to the connection 143 of the receiving holder 140. The motor M, preferably, a step motor, is used to rotate the receiving holder 140.

When the work piece fed by the conveyor belts 110 and 120 is inserted into the receiving holder 140, the receiving holder 140 rotates to the second position, discharging the work piece, thereby turning its over. While the receiving holder 140 completes the turning-over action and returns to the first position, the subsequent work piece is subjected to a temporary stop. For such stopping of the work piece, a pivotable stopper 151 is prepared on the base 100. During the turning-over of the work piece, the pivotable stopper 151 is so biased by a spring 152 that its stopping lug 151a protrudes over the conveyor belts 110 and 120 to thereby prevent the following work piece from advancing. When the receiving holder 140 returns to the first position, the pivotable stopper 151 is depressed by the lower plate 142 of the receiving holder 140, forcing the stopping lug 151a below the conveyor belts 110 and 120, allowing the following work piece to advance toward the receiving holder 140 position.

Figure 4:
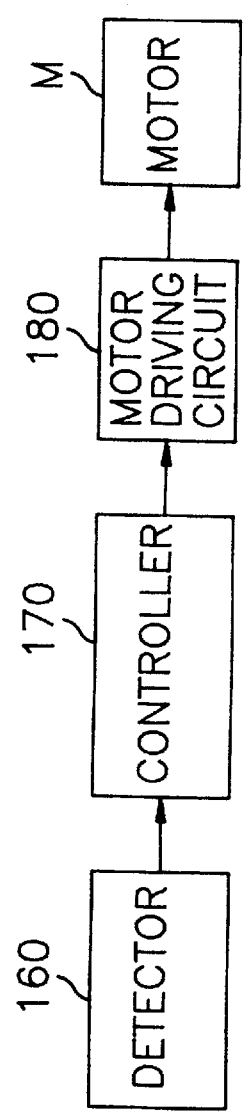
FIG. 4 is a schematic block diagram of a holder control means of the inventive device for turning over the work pieces.

Mounted on both sides of the receiving holder 140 is a detector 160 for detecting the insertion of the work piece into the receiving holder 140 at the first position. The detector 160 includes a sensor consisting of a light emitter 161 and a light receiver 162. At the first position, when the work piece is inserted in the receiving holder 140, it blocks a light beam emitted by the light emitter 161 and prevents the light beam from reaching the light receiver 162. When the light beam is blocked, the detector sends a signal to a controller 170, which, in turn, operates a motor driving circuit 180 to force the motor M to rotate by 180°, rotating the receiving holder 140 by the same amount, as shown in FIG. 4. As a result, the receiving holder 140 is rotated to the second position at which the receiving holder 140 unload the work piece on the conveyor belts 110 and 120, wherein the work piece placed on the conveyor belts is turned over.

A pair of guides 110a and 120a for preventing the work pieces from deviating from their predetermined lateral positions are mounted near the conveyor belts 110 and 120.

A limiter 153 for restricting a possible pivot range of the pivotable stopper 151 is mounted on the base 100.

The inventive turning-over device 200 constructed in this manner may be used to turn over various types of work pieces in automated machining or manufacturing lines. Hereinafter, operations of the inventive turning-over device are explained in a case that the work piece is a head drum for use in a video cassette recorder.

FIG. 2 shows the receiving holder 140 in the first position, with the plurality of head drum W being lined up on the conveyor belts 110 and 120. When the first head drum is inserted into the receiving holder 140, the inserted head drum blocks the light beam emitted from the light emitter 161 and prevents the light beam from reaching the light receiver 162.

Figure 3:
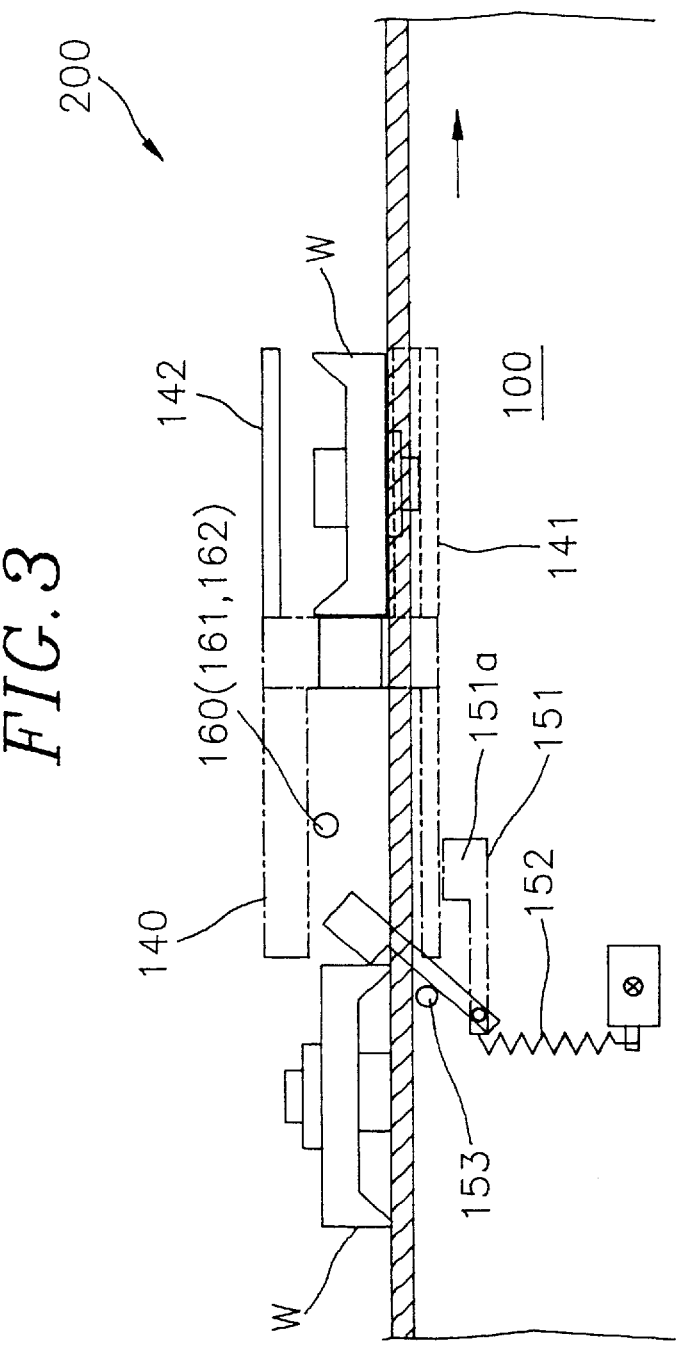

When the head drum W blocks the light beam, the detector 160 sends a signal to the controller 170, which, in turn, operates the motor driving circuit 180 to force the motor M to rotate by 180°. As a result, the receiving holder 140 is rotated to the second position, turning over the head drum W contained therein. In the second position, the head drum W is discharged from the receiving holder 140 and placed on the conveyor belts 110 and 120, as shown in FIG. 3. The receiving holder 140 is kept at the second position for a predetermined amount of time in order to completely discharge the head drum W. As soon as the head drum is discharged from the receiving holder 140, the controller 170 reversely rotates the motor M by 180° via the motor driving circuit 180. As a result, the receiving holder 140 rotates to the first position.

On the other hand, when the receiving holder 140 leaves the first position, the stopping lug 151a of the pivotable stopper 151 protrudes over the conveyor belts 110 and 120 to thereby prevent the subsequent head drum from trespassing into a swing area of the receiving holder 140. When the receiving holder 140 returns to the first position, the lower plate 142 thereof depresses the stopping lug 151a, forcing the stopping lug 151a below the conveyor belts 110 and 120, thereby allowing the following head drum to advance toward the receiving holder 140.

Although the operations of the inventive turning-over device is explained with reference to the head drum for use in the video cassette recorder, the inventive turning-over device may be used in turning-over other-types of work pieces.

Further, although the invention has been shown and described with respect to the preferred embodiment, it will be understood by those skilled in the art that various changes and modifications may be made without departing from the spirit and scope of the invention as defined in the following claims.

What is claimed is:

1. A device for turning over work pieces comprising:
   a base;
   a pair of transfer means for transferring the work pieces in an automated manufacturing line in a transfer direction, with the work pieces being kept on upper surfaces thereof, the pair of transfer means mounted on the base in a parallel relationship with each other and separated by a gap therebetween;
   a receiving holder including a substantially U-shaped receiver and joined to a connection having a rotation axis horizontally extending at a right angle with respect to the transfer direction of the transfer means, the receiving holder being located between the pair of transfer means, the receiving holder being rotatable between a first position, wherein the work piece is inserted into the U-shaped receiver and a second position, wherein the work piece is discharged therefrom;
   a holder control means for rotating the receiving holder to the second position, when the work piece is inserted into the U-shaped receiver and for reversely rotating the receiving holder to the first position, when the work piece is discharged from the U-shaped receiver; and
   a stopper means for preventing the subsequent work piece from being advanced by the transfer means while the receiving holder stays in other positions except the first position, the stopper means having a lever member pivotably attached to the base, a stopping lug formed at an end of the lever member and a spring, the lever member being biased by the spring so that the stopping lug protrudes over the transfer means to thereby prevent the work piece placed on the transferring means from advancing while the receiving holder stays in other position except the first position, and the lever member being depressed by a bottom of the U-shaped receiver so that the stopping lug is forced below the transfer means when the receiving holder stays in the first position.

2. The device for turning over work pieces of claim 1, wherein the holder control means includes
   a detector for generating a signal when the work piece is inserted into the U-shaped receiver;
   a motor connected to the rotation axis of the connection; and
   a controller for rotating the motor to allow the receiving holder to rotate to the second position in response to the signal from the detector and for reversely rotating the motor to allow the receiving holder to return to the first position after the work piece has been completely discharged from the U-shaped receiver.

3. The device for turning over work pieces of claim 2, wherein the detector has a light emitter and a light receiver which are mounted to co-operate in such a manner that a light beam emitted by the light emitter toward the light receiver is blocked, when the work piece is inserted into the U-shaped receiver at the first position.

4. The device for turning over work pieces of claim 1, wherein the pair of transfer means are a pair of conveyor belts.

5. A device for turning over work pieces comprising:
   a base;
   a pair of spaced apart, parallel conveyor belts mounted on the base, said belts arranged to support a work piece on upper surfaces thereof and transfer the work piece in a transfer direction;
   a receiving holder positioned between the conveyor belts and rotatable between a first position, wherein the work piece is received by the holder, and a second position, wherein the work piece is discharged from the holder, said receiving holder comprising an upper plate, a lower plate substantially parallel to the upper plate, and a connecting member therebetween, and means for rotating the receiving holder between the first and second positions;

pivotable stopper means situated between said belts and arranged to prevent a subsequent work piece from being advanced by the transfer means, said stopper means including a lug member movable between a position below the upper surfaces when the receiving holder is in the first position, and a position above the upper surfaces when said receiving holder is in the second position, said lug member being spring-biased against the lower plate, when the receiving holder is in the first position;

wherein the lower plate is positioned below said upper surfaces when the receiving holder is in the first position, and passes between the belts and past the upper surfaces, when the receiving holder is rotated from the first position to the second position.

6. The device of claim 5, further comprising a limiter mounted on the base at a point below the upper surface, said limiter arranged to limit a rotation of said pivotable stopper means, when the receiving holder is moved from the first position to the second position.

* * * * *